Feb. 18, 1941. K. FRÖHLICH 2,232,173
VEHICLE
Filed Jan. 17, 1939
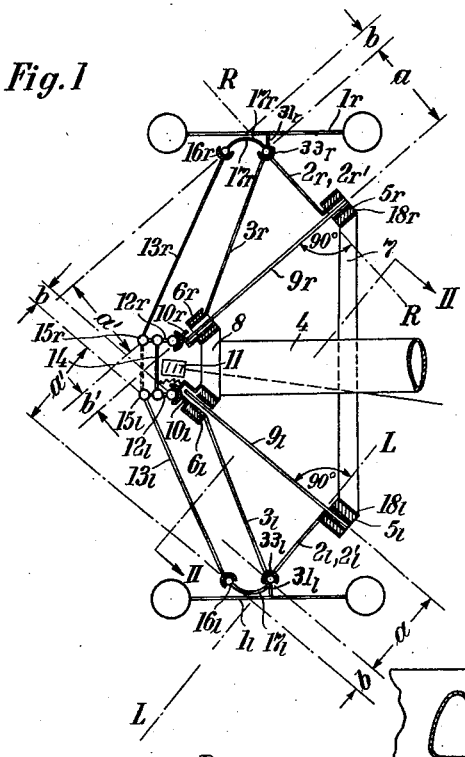
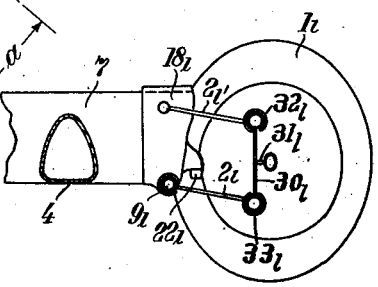
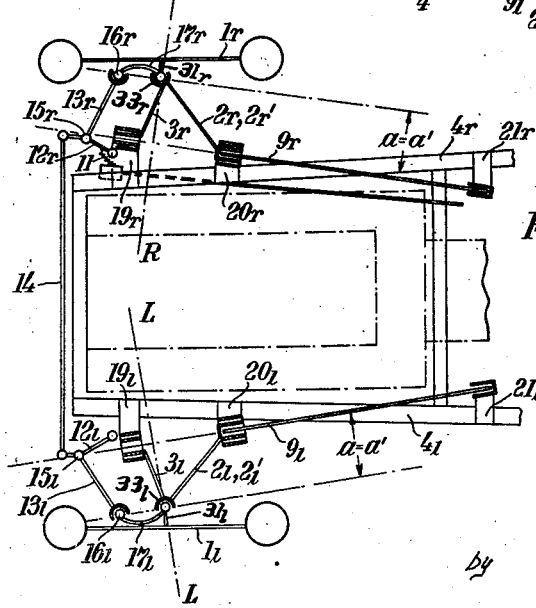
Inventor:
KARL FRÖHLICH
by
Attorneys Patented Feb. 18, 1941

2,232,173

UNITED STATES PATENT OFFICE 2,232,173

VEHICLE

Karl Fröhlich, Stuttgart, Germany, assignor to Dr. Ing. h. c. F. Porsche, K.-G., Stuttgart-Zuffenhausen, Germany, a company of Germany Application January 17, 1939, Serial No. 251,288
In Germany January 21, 1938

26 Claims. (Cl. 280—96.2)

An object of this invention is to provide an arrangement for mounting, springing and steering the wheels of a vehicle in a manner which is readily adaptable to the arrangement of the other vehicle parts, such as the frame, engine mounting, etc.

Another object of this invention is the provision of an independent vehicle wheel suspension in which the variation in wheel track and effects of the wheel forces is reduced.

A further object of this invention is the provision of an independent vehicle wheel suspension utilizing rotary springs, such as torsion rods, wherein the positioning of the springs and the length and arrangement of the connecting links may be varied in accordance with the constructional requirements of the vehicle with a greater freedom than heretofore possible.

Other objects and advantages of this invention will be apparent from the following detailed description thereof taken in connection with the attached drawing wherein:

Fig. 1 is a plan view as seen from below of a wheel mounting and suspension formed in accordance with this invention;

Fig. 2 is a cross-sectional view taken along the line II—II of Fig. 1, as seen in the direction of the arrows; and Fig. 3 is a plan view as seen from below of a modified form of wheel suspension and mounting in accordance with the principles of this invention.

As illustrated in Figs. 1 and 2 the unsprung wheel structure on opposite sides of the vehicle is indicated by the reference numerals $1_r$ and $1_l$. This unsprung wheel structure is comprised of the usual components, the details of which are of no importance in connection with this invention and have, therefore, not been illustrated nor will they be described in detail. Pivotally connected to a non-rotating portion of the unsprung wheel structure such as the vertical member $30_l$ carrying the stub axle $31_l$ are a pair of arms to $2'_l$ and $2_l$. The pivotal connection between the arms $2'_l$ and $2_l$ and the unsprung wheel structure is preferably brought about as indicated by spherical joints $32_l$ and $33_l$, although any equivalent type of universal connection may be used. A similar structure is provided on the opposite side of the vehicle in which $2_r$ and $2'_r$ are the connecting links, $31_r$ the stub axle and $33_r$ the lower spherical joint. A further link or bracing strut is provided for each wheel as best seen in Fig. 1. The bracing member $3_r$ is connected to the link $2_r$ at the spherical joint $33_r$; in a similar manner the bracing member $3_l$ is connected to the link $2_l$ at the spherical joint $33_l$.

The main vehicle frame is indicated at 4 as a longitudinally extending central tubular member. The links $2_r$ and $2_l$ are respectively journaled on the frame in bushings $5_r$ and $5_l$, while the bracing bars $3_r$ and $3_l$ are respectively journaled in bushings $6_r$ and $6_l$.

The two sets of bushings, $5_r$, $5_l$ and $6_r$, $6_l$ are shown as attached to the longitudinal central frame 5 through the media of transverse beam 7 and transverse head 8 respectively.

In order to resist the motion of the unsprung wheel structure relative to the frame, rotary spring means, preferably torsion rods $9_r$ and $9_l$ are provided. The torsion rods $9_r$ and $9_l$ may be attached to respective extensions $10_r$ and $10_l$ of the transverse head 8 of the frame 4 through the usual splined connection (not shown). At their other ends the torsion rods are interconnected with one of the wheel supporting and guiding links, in this case the lower links $2_r$ and $2_l$. The attachment between the torsion rods and the links is again preferably brought about through a splined connection between the torsion rods and suitable trunnions on these links. In order that the effective tension of the torsion rods upon the unsprung wheel structure may be finely adjusted, it is proposed that the number of splines at one end of the torsion rods differs from the number at the other end.

The previously mentioned bushings $5_r$, $5_l$, $6_r$, $6_l$ for the supporting links and bracing bars $2_r$, $2_l$, $3_r$ and $3_l$ are, in accordance with this invention, preferably rubber bushings which may, if desired, have springing characteristics similar to that of the torsion rods used. If this is done the rubber bushings can be kept relatively small. They will, however, add to the total springing effect, at least to a slight degree, especially if used for journaling the bracing bars $3_l$ and $3_r$.

The suspension described above lends itself to a sure and simple arrangement for steering of the vehicle wheels. The steering shaft 11 acting through the usual worm drive turns the steering lever $12_l$ which may be conveniently journaled in a bearing formed on the extension $10_l$ of the transverse head 8, which receives the frame-attached end of the torsion rod $9_l$. In order to preserve the geometrical relationship of the linkage system, the pivot point of the steering lever $12_l$ is preferably positioned as closely as possible along the extension of the longitudinal axis of the torsion rod $9_l$. On the opposite side of the frame the steering lever $12_r$ is likewise pivoted in a bearing on the transverse head extension $10_r$, and likewise preferably at a point positioned in the extension of the longitudinal axis of the torsion rod $9_r$.

Steering tie rods $13_r$ and $13_l$ are pivotally interconnected with the other end of the respective steering levers $12_r$ and $12_l$. A connecting rod 14 pivotally interconnecting the steering levers $12_r$ and $12_l$ transmits the motion of the one to the other. The connection between the rods $13_r$ and $13_l$ and levers $12_r$ and $12_l$ is preferably accomplished through spherical joints $15_r$ and $15_l$.

The tie rods $13_r$ and $13_l$ are respectively interconnected through spherical joints $16_r$ and $16_l$ with the steering knuckles $17_r$ and $17_l$ of the wheels $1_r$ and $1_l$.

It will be noted that the steering arrangement described above accommodates itself admirably to the linkage system of the wheel suspension and mounting. The steering gear will not interfere with the action of the spring suspension, and vice versa. This is especially true if the geometrical relationship of the two are correlated. This will be brought about if the length and arrangement of the links is so proportioned that, for example, the distance $a$, which is equal to the length of the wheel supporting links $2_r$, $2'_r$, $2_l$ or $2'_l$ is the same as the distance $a'$ which is the effective length of the steering tie rod $13_r$ and $13_l$ measured outwardly in a direction at right angles to the torsion rod. Likewise, the distance $b$ being the effective length of the steering knuckles $17_r$ or $17_l$ measured in the same direction, should be equal to the effective length $b'$ of the steering levers $12_r$ and $12_l$, measured in the same manner.

The upper of the wheel supporting links, $2'_l$ and $2'_r$ are preferably interconnected with the frame through shock absorbers $18_l$ and $18_r$ mounted on the transverse beam 7. The type of shock absorber and its particular manner of interconnection with the swinging link is of no particular importance as regards the present invention and this has, therefore, been neither shown nor described in detail.

It will be noted from the structure described above, taken in connection with Figs. 1 and 2, and more particularly the left side thereof, that the supporting links $2'_l$ and $2_l$ form with the transverse beam of the frame and the non-rotating parts of the unsprung wheel structure such as the vertical member $30_l$, a parallelogram permitting relative up and down movement of the unsprung wheel structure which is resisted by the action of the torsion rod $9_l$. Movement of the unsprung wheel structure is confined by the links $2'_l$ and $2_l$ to a vertical plane which is at substantially right angles to the axis of the torsion rod $9_l$. The torsion rod, however, is mounted on the frame at an angle to the direction of vehicle travel. As a result of this arrangement up and down movement of the wheel does not result in large variation in wheel track present in certain parallelogram types of suspension, while at the same time the turning moments produced by the centrifugal action of the wheels present in other forms of suspension are reduced to a tolerable degree.

It is often desirable that the total movement of the wheel be limited to a certain degree. For this purpose a resilient abutment such as a rubber abutment may be provided to act upon one of the wheel supporting links. Such an abutment may be provided to act upon one of the wheel supporting links. Such an abutment has been indicated at $22_l$ as acting upon the lower link $2_l$.

The arrangement illustrated in Fig. 3 operates on the same principle as that described above and illustrated in Figs. 1 and 2. Fig. 3, however, illustrates the manner in which the suspension system may be adapted to the other types of vehicle frame. The same reference numerals have been used in Fig. 3 as in Figs. 1 and 2 to identify similar parts.

In Fig. 3, the frame instead of consisting of a single central longitudinal member, consists of longitudinally extending side beams interconnected with the usual transverse frame member. These side beams are indicated as $4_r$ and $4_l$. The connecting links and bracing bars $2_r$, $2'_r$, $2_l$, $2'_l$, $3_r$ and $3_l$ are all mounted on bearings which are attached to the frame beam by outwardly extending brackets. The bracket $19_r$ holds the bearing for the bracing bar $3_r$, the bracket $19_l$ holds the bearing for the bracing bar $3_l$, the bracket $20_r$ holds the bearing 9 for the link $2_r$, and the bracket $20_l$ holds the bearing for the link $2_l$. In this form of construction the ends of the torsion rods attached to the frame extend toward the rear of the vehicle. Connection to frame for the torsion rod $9_r$ is made through the bracket $21_r$, while the connection of torsion rod $9_l$ is brought about through the bracket $21_l$. In this form of construction it will be noted that the links $2_r$, $2'_r$ and $2_l$, $2'_l$ do not extend at right angles to the respective torsion rod $9_r$ and $9_l$. However, the effective swinging plane of the nonrotated portion of the unsprung wheel structure is still at right angles to the axis of the torsion rod. This is brought about by a suitable proportioning of the bracing bar $3_r$ relative to the links $2_r$, $2'_r$, and the bracing bar $3_l$ relative to the links $2_l$, $2'_l$.

Steering of the wheel is effected through the members 11, $12_r$, $12_l$, $13_r$, $13_l$, 14, $15_r$, $15_l$, $16_r$, $16_l$, $17_r$ and $17_l$ acting similarly to the steering arrangement shown in Figs. 1 and 2. The links however, in this case differ in length from those previously described in order to accommodate the steering to the revised mounting of the wheel suspension. In this case the pivots $15_r$ and $15_l$ lie approximately along an extension of the respective torsion rods $9_r$ and $9_l$. The relationship wherein the distance $a$ is equal to the distance $a'$ is also to be maintained. In Fig. 3 the motor driving block has been indicated in dotted lines to show the manner in which the spring suspension adapt itself to all forms of construction.

All the advantages of the spring suspension illustrated in Figs. 1 and 2, such as lessening the variation in wheel track and reducing the turning moment are present in the arrangement illustrated in Fig. 3.

Many variations in my proposed construction are contemplated and will be apparent to those skilled in this art. So long as the geometrical arrangement of the wheel supporting links and bracing bars is retained together with their relationship relative to the torsion rods the proposed suspension may be mounted in any manner and at any angle relative to the frame. The torsion rods may extend above or below the frame, or even if desired, through suitable openings in the frame beams. The suspension is equally suitably usable in connection with a self-supporting frameless body.

The suspension can be used with all types of vehicles in which independent suspension is considered desirable, and while shown in connection with steered wheels it can also readily be adapted for use with driving wheels.

While only one torsion rod has been illustrated for use with each unsprung wheel structure, in accordance with the teachings of the prior art a plurality of such rods can be used. Other types of rotary springs are contemplated, as for example, rubber springs acting under torsion.

Accordingly, I do not intend the scope of this invention be limited to the structure described and illustrated, which has been included merely by way of example, but only as may be required by the claims which follow:

I claim:

1. In a vehicle having a frame, in combination, an unsprung wheel structure, means for independently connecting said unsprung wheel structure for up and down movement relative to said frame and limiting motion of a part of said unsprung wheel structure to a predetermined plane, comprising a pair of links pivotally interconnected at one end with said unsprung wheel structure and journaled at their other end on said frame to form a link parallelogram, rotary spring means mounted on said frame at an oblique angle to the direction of travel of the vehicle and at substantially right angles to said plane, and means for attaching one end of said rotary spring means to said frame and the other end to one of said links with its axis of rotation substantially co-axial with the journal axis of said link for resisting the motion of said unsprung wheel structure.

2. The combination according to claim 1, in which said rotary spring means is a torsion rod.

3. The combination according to claim 1, in which said links move in said plane.

4. In a vehicle having a frame, an unsprung wheel structure, means for independently connecting said unsprung wheel structure for up and down movement relative to said frame and limiting motion of a part of said unsprung wheel structure to a predetermined plane, comprising a rubber bushing on said frame, a pair of links pivotally connected at one end with said unsprung wheel structure and at their other end journaled to said frame to form a link parallelogram with said unsprung wheel structure and said frame, said rubber bushing serving as the frame journal for one of said links, rotary spring means mounted on said frame at an oblique angle to the direction of travel of the vehicle and at right angles to said plane, and means for attaching one end of said rotary spring means to said frame and the other end to one of said links with its axis of rotation substantially co-axial with the journal axis of said link for resisting motion of said unsprung wheel structure.

5. The combination according to claim 4, in which said rotary spring means is a torsion rod.

6. The combination according to claim 4, in which said links move in said plane.

7. The combination according to claim 4, in which said rotary spring means is connected to that link journaled on the frame in the rubber bushing.

8. In a vehicle having a frame, an unsprung wheel structure, means for independently connecting said unsprung wheel structure for up and down movement relative to said frame and limiting motion of a part of said unsprung wheel structure to a predetermined plane, comprising a rubber bushing on said frame, a pair of links pivotally connected at one end with said unsprung wheel structure and at their other end journaled to said frame to form a link parallelogram with said unsprung wheel structure and said frame, said rubber bushing serving as the frame journal for one of said links, rotary spring means mounted on said frame at an angle to the direction of travel of the vehicle and at right angles to said plane, said rubber bushing having substantially the same springing characteristics as said rotary spring means, and means for attaching one end of said rotary spring means to said frame and the other end to one of said links with its axis of rotation substantially co-axial with the journal axis of said link for resisting motion of said unsprung wheel structure.

9. The combination according to claim 1, in combination with a bracing bar journaled at one end on said frame to pivot co-axially with said rotary spring means, and rigidly interconnected at its other end with that end of one of said links connected to the unsprung wheel structure.

10. The combination according to claim 4, in combination with a bracing bar journaled at one end on said frame to pivot co-axially with said rotary spring means, and rigidly interconnected at its other end with that end of one of said links connected to the unsprung wheel structure.

11. In a vehicle having a frame, an unsprung wheel structure, means for independently connecting said unsprung wheel structure for up and down movement relative to said frame and limiting motion of a part of said unsprung wheel structure to a predetermined plane, comprising a pair of links pivotally interconnected at one end with said unsprung wheel structure and journaled at their other end on said frame to form with said unsprung wheel structure and said frame a link parallelogram, a rubber bushing mounted on said frame, a bracing bar journaled at one end in said rubber bushing and rigidly interconnected at its other end with one of said links substantially at the latter's pivotal interconnection with said unsprung wheel structure, rotary spring means mounted on said frame and at substantially right angles to said plane, means for attaching one end of said rotary spring means to said frame and the other end to one of said links with its axis of rotation substantially co-axial with the journal axis of said link for resisting the motion of said unsprung wheel structure.

12. The combination according to claim 11, in which said rotary spring means is a torsion rod.

13. The combination according to claim 11, in which said links move in said plane.

14. The combination according to claim 11, in which said rubber bushing has substantially the same springing characteristics as said rotary spring means.

15. The combination according to claim 11, in which said rubber bushing is co-axial with the axis of said rotary spring means, and said bar and rotary spring means are connected to the same link of the parallelogram.

16. The combination according to claim 1, in combination with a shock absorber mounted on said frame, and means for interconnecting the other of said links with said shock absorber for actuation thereof.

17. The combination according to claim 1, in combination with a resilient abutment on said frame positioned in the path of movement of one of said links to limit the upward movement of said unsprung wheel structure.

18. The combination according to claim 1, wherein the rotary spring means is provided with a plurality of splines at each end thereof for connecting said rotary spring means to said frame and one of said links, the number of splines at one end of said rotary spring means differing from the number at the other end, whereby a fine adjustment of the spring reaction is procured.

19. In a vehicle having a frame, in combination, an unsprung wheel structure, means for independently connecting said unsprung wheel structure for up and down movement relative to said frame and limiting motion of a part of said unsprung wheel structure to a predetermined plane, comprising a pair of links pivotally interconnected at one end with said unsprung wheel structure and journaled at their other end on said frame to form a link parallelogram, rotary spring means mounted on said frame at an angle to the direction of travel of the vehicle and at substantially right angles to said plane, means for attaching one end of said rotary spring means to said frame and the other end to one of said links with its axis of rotation substantially co-axial with the journal axis of said link for resisting motion of said unsprung wheel structure, a steering lever attached to said unsprung wheel structure, a tie rod pivotally interconnected with said steering lever, and a steering arm pivotally interconnected at one end to the other end of said tie rod and at its other end to the frame, the pivotal point of said steering arm on said frame lying substantially along an extension of the axis of said rotary spring means.

20. The combination according to claim 19, in which the distance from the axis of the rotary spring means to the point of pivotal interconnection of its connecting link with the unsprung wheel structure is equal to the distance between the ends of the tie rod, as measured at right angles to the axis of the rotary spring means.

21. In a vehicle having a frame, in combination, an unsprung wheel structure, means for independently connecting said wheel structure for up and down movement relative to said frame and limiting motion of a part of said wheel structure to a predetermined plane, comprising a pair of links pivotally interconnected at one end with said wheel structure and journaled at their other end on said frame to form a link parallelogram, a steering lever attached to said wheel structure, a tie rod pivotally interconnected at one end with said steering lever, a steering arm pivotally interconnected at one end to the other end of said tie rod and at its other end to the frame, the pivotal point of said steering arm on said frame lying substantially along an extension of the journal axis of one of said links on said frame, and the distance from said axis to the point of pivotal interconnection of its connecting link with the wheel structure being equal to the distance between the ends of the tie rod, as measured at right angles to said axis, and means for springing said wheel structure relatively to said frame.

22. The combination according to claim 21, in combination with a bracing bar journaled at one end on said frame to pivot co-axially with said one link and rigidly interconnected at its other end with that end of said one link connected to the wheel structure.

23. The combination according to claim 21, in which the distance between the ends of said steering lever is equal to the distance between the ends of said steering arm, as measured at right angles to said axis.

24. The combination according to claim 19, in which the distance from the axis of the rotary spring means to the point of pivotal interconnection of its connecting link with the unsprung wheel structure is equal to the distance between the ends of the tie rod, as measured at right angles to the axis of the rotary spring means, and in which the distance between the ends of said steering lever is equal to the distance between the ends of said steering arm, as measured at right angles to said axis.

25. The combination according to claim 19, in which the distance between the ends of said steering lever is equal to the distance between the ends of said steering arm, as measured at right angles to the axis of the rotary spring means.

26. In a vehicle having a frame, in combination, an unsprung wheel structure, means for independently connecting said wheel structure for up and down movement relative to said frame and limiting motion of a part of said wheel structure to a predetermined plane, comprising a pair of links pivotally interconnected at one end with said wheel structure and journaled at their other end on said frame to form a link parallelogram, a steering lever attached to said unsprung wheel structure, a tie rod pivotally interconnected at one end with said steering lever, a steering arm pivotally interconnected at one end to the other end of said tie rod and at its other end to the frame, the pivotal point of said steering arm on said frame lying substantially along an extension of the journal axis of one of said links on said frame, and the distance between the ends of the said steering lever being equal to the distance between the ends of said steering arm, as measured at right angles to said axis, and means for springing said wheel structure relatively to said frame.

KARL FRÖHLICH.